United States Patent [19]

Fosse et al.

[11] Patent Number: 4,833,275
[45] Date of Patent: May 23, 1989

[54] FLEXIBLE SPLICE FOR AN IMPREGNATED PAPER SUBMARINE CABLE

[75] Inventors: Raymond Fosse, Saint Genis Laval; Henri Thévenon, Lyons, both of France

[73] Assignee: Les Cables de Lyon, Clichy, France

[21] Appl. No.: 162,511

[22] Filed: Mar. 1, 1988

[30] Foreign Application Priority Data

Mar. 4, 1987 [FR] France ............................... 87 02929

[51] Int. Cl.$^4$ ............................................. H02G 15/24
[52] U.S. Cl. .................................. 174/21 R; 174/88 R
[58] Field of Search ............................ 174/21 R, 88 R

[56] References Cited

U.S. PATENT DOCUMENTS

| 3,303,266 | 2/1967 | Thompson | 174/88 R |
| 3,342,929 | 9/1967 | Kleinfelder et al. | 174/88 R |
| 3,819,849 | 6/1974 | Baker | 174/86 |
| 4,225,746 | 9/1980 | Ball | 174/21 R X |
| 4,495,379 | 1/1985 | Thevenon | 174/88 R |

FOREIGN PATENT DOCUMENTS 683808 11/1939 Fed. Rep. of Germany .
489798 9/1938 United Kingdom .
2149981 6/1985 United Kingdom .

Primary Examiner—Morris H. Nimmo
Attorney, Agent, or Firm—Kenyon & Kenyon

[57] ABSTRACT

A flexible splice for a submarine cable of the type comprising a plurality of conductors (21, 22, 23) insulated by paper impregnated with oil under pressure (24) inside an oil-tight sheath (20) protected by at least one layer of armoring, the splice being characterized in that it comprises a flexible sheath (2) connected on either side of the interconnections (41, 42, 43) between said conductors to two rigid connection sleeves (1, 1') fittable around respective centering rings (7, 7') bonded to the oil-tight sheath (20) of the cable and then bonded to said sleeves, said flexible sheath being divided into two lengths (2, 2') which are interconnected by means of an inner ring (15) which they overlap prior to being bonded together and covered with a tubular shell (4) constituting an oil-tight sheath which is bonded at each end to said connection sleeves (1, 1'), said sleeves including at least one orifice (33) closable by means of a stopper (30) in order to put the splice under oil pressure.

9 Claims, 4 Drawing Sheets

1

FLEXIBLE SPLICE FOR AN IMPREGNATED PAPER SUBMARINE CABLE

The present invention relates to a flexible junction for a multi-conductor submarine cable whose conductors are insulated by oil-impregnated paper, and in particular to a cable of the type having two layers of armoring.

BACKGROUND OF THE INVENTION

Power cables often include conductors which are insulated by paper tapes impregnated with oil which is maintained under pressure and protected by an oil-tight sheath of lead or aluminum. The oil pressure is about 15 bars for cables intended for laying in the seat to depths of about 100 meters, thereby compensating for loss of head in the oil channel and balancing the static pressure to which the cable is subjected at the water bottom.

Cables of the type having two layers of armoring are such that the oil-tight sheath of lead or aluminum is surrounded by two coaxial layers of armoring, namely inner armoring and outer armoring. The inner armoring for traction or carrier purposes is frequently constituted by a layer of steel wires wound around the sheath at a long pitch, while the outer armoring for providing protection is often constituted by steel wires wound at a short pitch.

When it is necessary to make a splice between two lengths of cable, there are several ways of proceeding. One of these ways consists of enclosing the connections between the various electrical conductors in a rigid housing which is bonded to the oil-tight sheaths of the two-lengths of cable to be joined. The inside of the rigid housing is then put under oil pressure, and the splice is terminated with all of the necessary protective layers around the housing and around the oil-tight sheaths in the vicinity of the housing. This technique is suitable for making repairs or for connecting together two lengths of cable which are intended to remain at the bottom of the sea, however it suffers from the drawback of impeding cable handling, should the cable ever be moved or raised from the bottom back to the surface. The presence of a rigid housing makes it difficult to wind the cable on a drum or in the hold of a boat.

Patent documents FR-A 2 555 372 or GB-A 2149981 also describe making a flexible splice for submarine cables of the above type by replacing the lead or aluminum oil-tight sheaths over the splice with a cylindrical envelope having corrugated walls, which envelope is bonded to the sheaths via rigid connection pieces. However, the increase in the outside diameter of the cable at the splice remains considerable, and this type of splice is not suitable for a submarine cable with two layers of armoring, and in particular it is not suitable for cables having outer protective armoring at a very short pitch.

The present invention seeks to provide a flexible splice for an impregnated paper submarine cable which includes at least one layer of armoring, with the outside diameter of the splice being less than in the prior art and with the splice being capable of being subjected to the same handling as the cable, both at sea and in the factory.

SUMMARY OF THE INVENTION

The present invention provides a flexible splice for a submarine cable of the type comprising a plurality of conductors insulated by paper impregnated with oil under pressure inside an oil-tight sheath protected by at least one layer of steel wire armoring, the splice comprising a flexible sheath connected on either side of the zone in which said conductors are interconnected to two rigid connection sleeves each fitted around a respesctive centering ring bonded to the oil-tight sheath of the cable and ot said sleeve, said flexible sheath being divided into two lengths which are interconnected by means of an inner ring to which they are bonded, said flexible sheath being covered with a tubular shell constituting an oil-tight sheath which is bonded to wach of said connection sleeves, said sleeves including at least one orifice closable by means of a stopper in order to put the splice under oil pressure.

Advantageously, and for the purpose of reducing the outside diameter of the splice, said interconnections between the conductors are offset from one another along the longitudinal axis of the splice. The interconnections between the conductors may be made by brazing or by means of wire clamps.

Preferably, the cable includes two coaxial layers of armoring, with an inner layer at a long pitch and an outer layer at a short pitch. The inner layer is intended to impart good traction strength to a cable, while the outer layer prevents the cable from being damaged by anchors, fishing equipment, or a rocky bottom.

The long pitch inner layer of armoring is constituted by a sheet of steel wires wound around the oil-tight sheath at a long pitch, and is reconstituted around the splice by interconnecting said steel wires by means of turnbuckles having oppositely handed threads, such as those described in patent documents FR-A 2 537 357 or U.S. Pat. No. 4,495,379.

The outer, short-pitch layer of armoring is interrupted on either side of the splice beyond said sleeves and is replaced over the splice by a short-pitch helical spring which overlaps a certain length of the outer layer. This spring is advantageously made from the same steel wire as the inner layer or armoring. It may be constituted by a plurality of equal length portions which are interconnected by welding after being put into place.

Between each of the main layers such as those described above, there may be intermediate layers such as foils, conical or cylindrical packing for making up the diameter or for protection purposes, binding, etc. Thus, a protective foil may be interposed between said flexible sheaths and said tubular shell constituting the oil-tight sheath. Likewise, the tubular shell may have binding around it in order to improve its strength for withstanding internal pressure.

In an advantageous embodiment of the invention, said flexible sheath is made of metal and may be constituted by a folded-seam helical foil, for example of the type referred to as an "interlock tube" by the person skilled in the art.

When the flexible sheath is of such a type, it becomes advantageous to provide screw threads on said sleeves and on said inner ring with the pitch of the screw threads matching the winding pitch of the folded-seam helical foil constituting the flexible sheath. This disposition facilitates the positioning of the various components prior to bonding.

BRIEF DESCRIPTION OF THE DRAWINGS

An embodiment of the invention is described by way of example with reference to the accompanying drawings, in which.

MORE DETAILED DESCRIPTION

Figure 1:
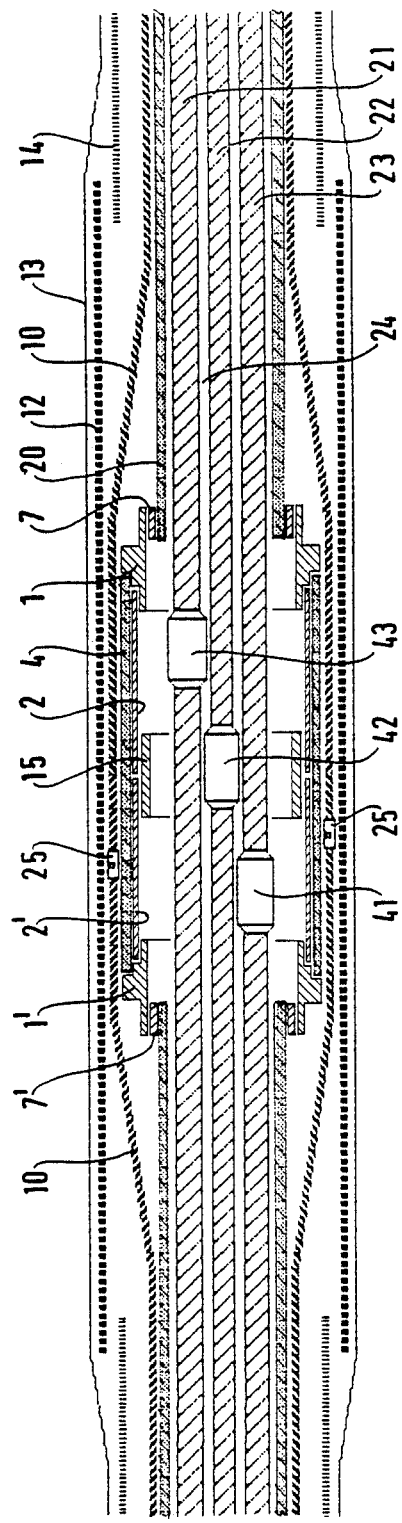
FIG. 1 is a diagrammatic overall view in longitudinal section through a splice in accordance with the invention.

FIG. 1 is a diagrammatic overall view which is substantially centered on a splice in accordance with the invention. At the ends of the figure, i.e. on either side of the splice, a submarine cable comprises three electrical conductors 21, 22, and 23 which are insulated from one another by paper which is impregnated with oil under pressure 24. The core of each of the conductors is hidden by the paper wound around it, and in order to clarify the drawing, the conductors are shown as being one above the other, whereas in reality they are often wound around each other at a long pitch. The oil under pressure 24 in which the conductors are immersed is contained within an oil-tight sheath 20. Going outwardly from this oil-tight sheath the main components of the cable comprise: an inner layer of armoring 10 at a long pitch, an outer layer of armoring 14 at a short pitch, and an outside jacket 13 for finishing the cable.

It is recalled that FIG. 1 is diagrammatic and that the relative sizes of the various items shown may be different. For example, for a three-core cable having two layers of armoring and an outside diameter of 130 mm, the splice may have a diameter of 160 mm and extend over a length of 11 meters (m).

In order to provide offset interconnections 41, 42, and 43 between conductors 21, 22, and 23 with the other corresponding conductors, the oil-tight sheath 20, the inner and outer layers of armoring 10 and 14, and the jacket 13 are stripped back over respective increasing distances. Only the inner layer of armoring 10 is not removed: it is cut in the vicinity of the middle of the splice and is then unwound so as to make it possible to subsequently reconstitute it by interconnecting its component steel wires using turnbuckle devices 25 having oppositely handed screw threads, as described in patent document FR-A 2 537 357.

Each of the two free ends of the sealed sheath 20 is fitted with an outer centering ring 7, 7' which is soldered onto the sheath 20, and a centering sleeve 1, 1' can be engaged around the ring. The two sleeves 1, and 1' are connected by a flexible sheath 2, preferably built up from two lengths 2 and 2'. Each length of sheath is fixed to the corresponding sleeve. The two lengths of flexible sheath 2 and 2' are interconnected in the middle of the splice by means of an inner ring 15 which each of them overlaps to a certain extent prior to being soldered together. A shell 4 constituting the oil-tight sheath is disposed around the said flexible sheath and its ends are soldered to the two connection sleeves 1, 1'.

The ends of the outer armoring layers 14 are interconnected by a helical spring 12 which overlaps them over a certain length. Finally, the cable jacket 13 is reconstituted or extended around the splice.

In accordance with the present invention, said flexible sheath 2 is advantageously constituted by a folded-seam helically-wound foil of the type used for armoring the cables of immersed pumps. One such type of flexible tube is referred to as "interlock tube" by the person skilled in the art. For example, the flexible metal sheaths sometimes fitted around shower hoses in some types of bathroom equipment are often sheaths of this type. If the sleeves 1 and 1' and the ring 15 are provided with screw threads matching the winding pitch of said folded-seam helically-wound foil, then the two lengths of said flexible sheath 2 and 2' may be screwed onto said connection sleeves 1, 1' and onto said inner ring 15 in order to facilitate placement prior to soldering.

Once the conductors have been interconnected, the two lengths of said flexible sheath are welded to said inner ring 15 and to said connection sleeves 1 and 1'. Similarly, at each end of the splice, the sleeve 1 or 1', the centering ring 7 or 7', and the corresponding end of the oil-tight sheath 20 are also soldered together.

Said shell 4 constituting the oil-tight sheath over the splice is advantageously made of lead and is in the form of a tube which is split along a generator line and which is closed by longitudinal soldering after being put into place.

At each end of the splice, said oil-tight sheath 20 is temporarily stripped of the inner layer of armoring 10 over such a length as to make it possible to engage over said oil-tight sheath 20 the corresponding length of said flexible sheath 2 in order to have access to a sufficient length of the conductors 21, 22, and 23 in order to be able to offset the respective interconnections thereof along the longitudinal axis of the splice in order to facilitate obtaining a splice having a small outside diameter.

Figure 2:
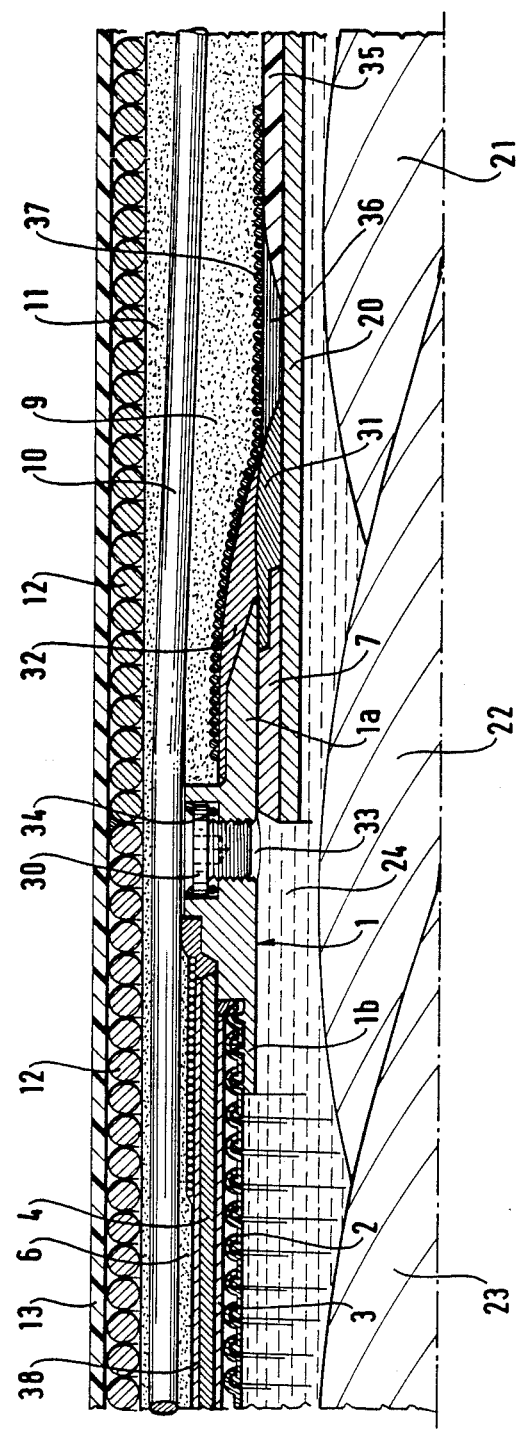
FIG. 2 is a fragmentary detail view in longitudinal half section through the FIG. 1 splice.

FIG. 2 shows a detail of the FIG. 1 splice in longitudinal half section about one of the sleeves 1. In this figure, the proportions of the various components correspond to a possible practical embodiment. The conductors 21, 22, and 23 can be seen insulated by paper impregnated with oil under pressure 24. The sleeve 1 comprises a centrally hollow cylinder extending axially at its ends in the form of first and second hollow cylinders 1a and 1b having the same inside diameter but having smaller outside diameters. The first cylinder 1a is terminated on the outside by a cone. Said second cylinder 1b is stepped on the outside of its free end and the axially portion of this step is given a screw thread at a pitch corresponding to that of the interlock type flexible sheath 2, thereby enabling the sheath to be screwed onto said sleeve. Said central hollow cylinder has a radially extending orifice 33 which is closable by means of a screw stopper 30 which compresses a sealing ring 34 when closed. This orifice is used for processing the splice, where processing comprises a stage during which the splice is evacuated in order to verify oil tightness, and a stage during which it is filled with oil under pressure, after which the stopper is put into place and is soldered to the sleeve 1.

A polyethylene sheath 35 may be provided around the oil-tight sheath 20.

In order to interconnect the three conductors, an operating field for connection purposes is disengaged as follows. After unwinding the steel wires of the cable's inner layer of armoring 10 over a sufficient length as explained above, the corresponding length of flexible sheath 2 screwed onto its sleeve 1 is threaded together with its centering ring 7 over the disengaged oil-tight sheath 20 at each end. After connection, the two lengths of sheath 2 and 2' are moved towards each other by sliding the corresponding rings 7 over each cable end up to the edges of the sheath 20.

The first cylinder 1a constitutes the portion of the sleeve which overlaps said centering ring 7, and the ring is held in place around the free end of the oil-tight sheath 20 of the cable by a solder fillet 31 which extends the ring 7 over the cable. In order to connect the end of the polyethylene sheath 35 to the solder fillet 31, reinforced adhesive tape 36 is wound in place up to the outside diameter of said polyethylene sheath 35. After the sleeve 1 has been soldered in place around the centering ring 7 by means of a second solder fillet 32 (while making sure that the opening 33 remains disengaged), a binding of copper wires 37 is wound around said first cylinder, around said second solder fillet 32, around the reinforced adhesive tape 36, and around the end of said polyethylene sheath 35.

At the other end of the sleeve 1, i.e. its end directed towards the middle of the splice, a lead shell 4 is put into place around said flexible sheath 2 and around said second cylinder 1b of the sleeve 1, with the tube being in the form, for example, of a split tube which is then longitudinally welded. The lead shell 4 is soldered to said second cylinder of said sleeve 1.

Advantageously, a stainless steel foil 3 may be interposed between said flexible sheath 2 and said lead shell 4, and the shell may have a binding of foil and/or reinforced adhesive tape 38 in order to enable it to withstand the pressure of the oil 24.

Packing 6 and 9 is then put into place at either end of said central cylinder of the sleeve 1, with packing 6 being at the splice end and packing 9 being at the cable end, said packing serving to build up to the outside diameter of said central cylinder so as to provide the inner layer of armoring 10 to be reconstituted with a smooth surface free from radial projections.

Once the inner armoring 10 has been put back into place, further packing 11 is provided around the inner armoring in order to compensate for the difference in outside diameter of the inner armoring 10 and to reconstitute a perfectly cylindrical outer surface. A plurality of helical springs (not separately shown) constituting the outer armoring 12 over the splice are then put into place around the conical packing 11 and are interconnected by welding, and the assembly is covered with a finishing jacket 13.

Figure 3:
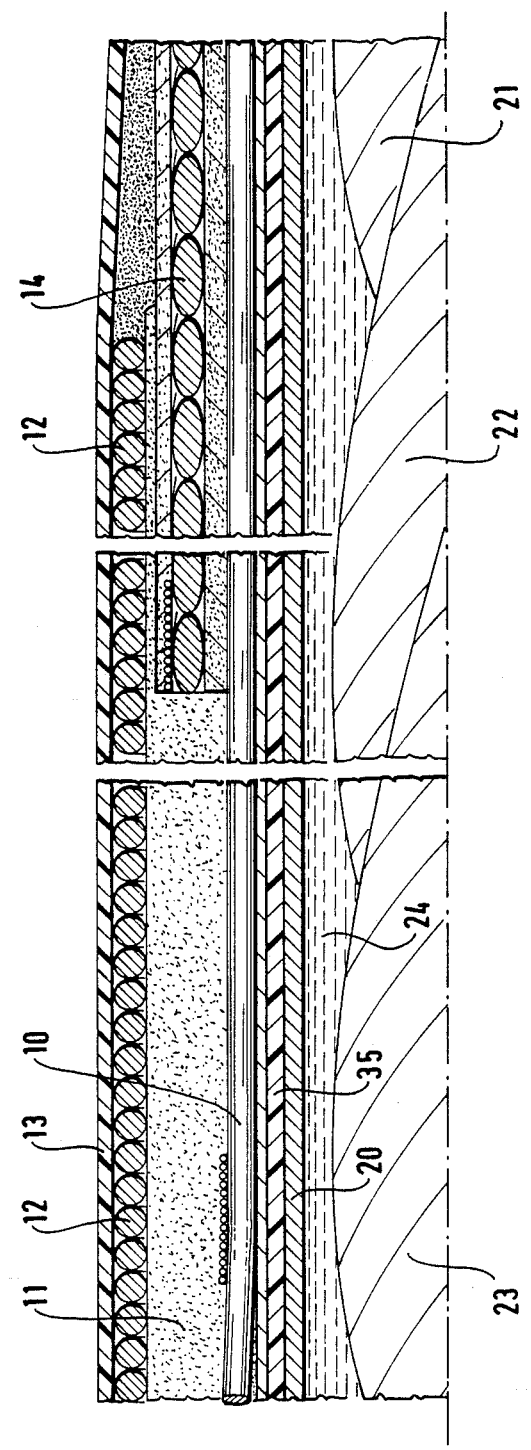
FIG. 3 is another fragmentary detail view in longitudinal section through the FIG. 1 splice.

FIG. 3 is a fragmentary detail view showing how the outer armoring 14 of the cable is overlapped by the helical springs constituting the outer armoring 12 of the splice. This figure shows the outer finishing jacket 13, the packing 11 between the helical springs of the outer armoring 12 splice and the long pitch inner armoring 10, and the polyethylene sheath 35 which surrounds the oil-tight sheath 20. The other layers shown are not given references since they do not directly concern the invention per se.

Figure 4:
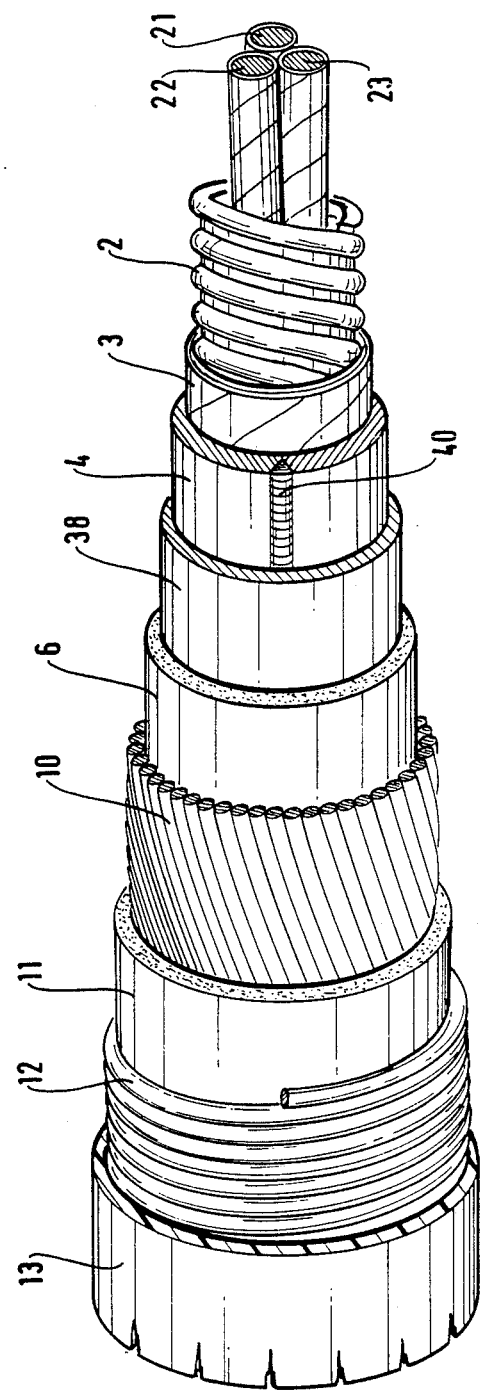
FIG. 4 is a cut-away view of the central portion of a splice in accordance with the invention.

FIG. 4 shows the various layers constituting the conductors and the surrounding envelope at the splice, i.e. between the two connection sleeves 1, and in accordance with the example shown in the preceding figures. Going outwardly from the center, the following are encountered in order: the three conductors 21, 22, and 23 insulated by oil-impregnated paper; the flexible sheath 2 of folded-seal helically-wound foil; the stainless steel foil 3; the lead shell 4 with its longitudinal weld 40; the binding foil 38; the packing 6; the inner long-pitch armoring 10; the packing 11; the helical spring armoring 12; and finally the finishing jacket 13.

The sequence of operations for making an example of a splice in accordance with the invention is summarized as follows:

Prepare the cable.

Remove the outer protective yarn wrapping over an adequate length, e.g. 12 meters.

Remove and cut off the short-pitch armoring 14 over the same length.

Mark a cutting point in the middle of this length.

Bind the long-pitch armoring 10 as now revealed using reinforced adhesive tape.

Cut the cable after initially switching off the oil feed. Run a little oil from each part of the cable to remove cutting waste and to lift the cable ends to avoid ingress of air.

Slide on the helical springs of the armoring 12.

Overlap the cable ends partially.

Move out of the way the long-pitch armoring 10 beyond the adhesive tape together with the yarn and galvanized foil, for later use.

Slide the connection pieces for connecting the lead sheath of the cable to the interlock tube 2 (said pieces comprising a sleeve 1 and a centering ring 7 for the sleeve 1), together with the inner ring 15 for interconnecting the interlock tube 2.

Slide on the interlock tubes 2.

Remove the lead sheaths.

Remove the insulating paper over a certain length.

Interconnect the conductors.

The various conductors are interconnected by cable clamp means. The edges of the cable clamp jaws are then filed to obtain a cylindrical profile.

Reconstitute the paper insulation of the conductors.

Interconnect the oil-tight lead sheaths.

Put the interlock tubes 2 into position with their brazed sleeves 1.

Adjust the lengths of the interlock tubes 2 at their non-brazed ends in order to position the sleeves 1 properly on the lead sheaths.

Solder the centering ring 7 onto the lead sheath of the cable in an oil-tight manner.

Put the interlock tube 2 into place.

Solder the centering ring 7, the sleeve 1, and the lead sheath of the cable together. This is the oil-tight solder fillet 31. It should extend for at least 50 mm over the lead sheath.

Solder the interlock tubes 2 together and to the inner ring 15.

Hide the grooves in the interlock tube 2 by taping on a protective stainless steel foil 3. Prevent the foil from coming undone by binding and soldering. The protective foil 3 could alternatively be made of copper.

Put the open lead shell 4 into place.

Close the shell 4 longitudinally by autogenous welding.

Solder the lead sheath 4 onto the sleeve 1.

Verify that the bonds (i.e. welds, soldering or brazing, etc.) are oil-tight by connecting a vacuum installation to the orifices in the sleeves 1.

Reinforce and prepare the oil-tight sheaths prior to impregnation.

Taper the polyethylene sheath 35 around the lead sheath of the cable in the vicinity of the centering ring 7.

Reconstitute the polyethylene sheath 35 with reinforced tape 36.

Rewind the cable foil around the oil-tight solder fillet.

Prevent the foil from coming undone by binding with tin copper wires; this foil is the foil that was retained when the cable was prepared. It is rewound over the polyethylene sheath 35 of the cable up to the oil-tight solder fillet 31.

Provide the reinforcing solder fillet 32 between the sleeve and the foil.

Bind the reinforcing solder fillet 32 using touching turns 37.

Refill the junction with oil and seal by soldered screws 30.

Interconnect the long-pitch inner armoring 10.

Wind reinforced tape 6 between the sleeves 1 to build up the outside diameter of the sleeves, and wind five layers of reinforcement beyond the sleeves over the foil reconstituting binding.

Make a cone 9 between the sleeve 1 and the cable using alternating Scotchfil and Scotchrap filler tapes over 500 mm. The cone 9 tapers smoothly from the sleeve to the cable.

Protect the assembly with a Scotch-21 type tape.

Install a layer of jaconet cloth in order to facilitate laying the long-pitch armoring 10.

Rewind the long-pitch inner armoring 10 and hold in place by means of binding. After observing the points where the wires overlap, they are interconnected by turnbuckle means 25 having oppositely handed threads. The turnbuckles may be offset from one another.

Interconnect of the outer short-pitch armoring 14.

Bring the diameter of the splice up to the diameter of the springs of the outer armoring 12 by taping in order to obtain a cylindrical mat 11 which also covers the threads remaining on the short-pitch armoring 14 of the cable over about 750 mm, said taping being performed in the same manner as the cone 9 between the sleeve 1 and the cable .

Slide the springs of the outer armoring 12 over the mat made in this way.

Put the springs of the outer armoring 12 into position and arc weld them together. The springs must cover the short-pitch armoring 14 of the cable over about 750 mm.

Put the jacket 13 protecting the assembly into place.

Bind the armoring 12 constituted by the welded together springs with a jacket 13. Reconstitute the cable threads after making a conical transition at each end of the welded together springs over about 200 mm using jaconet cloth.

Prevent the jacket 13 from coming undone by binding with reinforced tape.

We claim:

1. A flexible splice between two lengths of a submarine cable, each length of cable including a plurality of conductors insulated by paper impregnated with oil under pressure inside an oil-tight sheath protected by at least one layer of armoring, the splice comprising interconnections between said conductors of each length of cable; two rigid connection sleeves fitted around respective centering rings on either side of said interconnections, the centering rings being bonded to the oil-tight sheath of each length of cable and then being bonded to said sleeves; a flexible sheath connected to the two rigid connection sleeves, said flexible sheath being divided into two lengths which overlie and are bonded to an inner ring which is disposed axially at a junction between the two lengths of the flexible sheath; a tubular shell covering the flexible sheath, the shell constituting an oil-tight sheath which is bonded at each end to said connection sleeves including at least one orifice closable by means of a stopper in order to put the conductors inside the flexible sheath and tubular shell under oil pressure.

2. A flexible splice between two lengths of a submarine cable according to claim 1, wherein said at least one layer of armoring, referred to as "inner" armoring, is constituted by metal wires wound at a long pitch along the cable, and wherein said splice further comprises turnbuckle means interconnecting said metal wires.

3. A flexible splice between two lengths of a submarine cable according to claim 2, wherein said at least one layer of armoring further incldues an outer layer of short-pitch armoring and wherein the splice further comprises helical springs which are welded end-to-end, said springs covering said outer armoring of the cable over a certain length on either side of said splice, said outer armoring being disposed outside said inner armoring.

4. A flexible splice between two lengths of a submarine cable according to claim 1 or claim 2 or claim 3, wherein said flexible sheath is made up from a folded-seam helically-wound foil.

5. A flexible splice between two lengths of a submarine cable according to claim 4, wherein said connection sleeves and said inner ring are provided with screw threads at the winding pitch of said folded-seam helically-wound foil on portions thereof which are connected to said flexible sheath.

6. A flexible splice between two lengths of a submarine cable according to claim 1, wherein said interconnections between the conductors are axially offset from one another.

7. A flexible splice between two lengths of a submarine cable according to claim 1, wherein said tubular shell is enclosed over said flexible sheath by longitudinal welding.

8. A flexible splice between two lengths of a submarine cable according to claim 7, wherein said tubular shell is made of lead.

9. A flexible splice between two lengths of a submarine cable according to claim 1, wherein said tubular shell is made of lead.

* * * * *

UNITED STATES PATENT AND TRADEMARK OFFICE
CERTIFICATE OF CORRECTION

PATENT NO. : 4,833,275

DATED : 23 May 1989

INVENTOR(S) : Raymond FOSSE et al.

It is certified that error appears in the above-identified patent and that said Letters Patent is hereby corrected as shown below:

| Column | Line |  |
|--------|------|--|
| 1 | 15 | Change "seat" to --sea--. |
| 2 | 5 | Change "spesctive" to --spective--. |
| 2 | 6 | Change "ot" to --to--. |
| 2 | 10 | Change "wach" to --each--. |
| 5 | 49 | After "12" insert --of the--. |
| 7 | 45 | Change "amroring" to --armoring--. |
| 8 | 28 | Change "incldues" to --includes--. |

Signed and Sealed this

Twenty-third Day of January, 1990

*Attest:*

JEFFREY M. SAMUELS

*Attesting Officer*     Acting Commissioner of Patents and Trademarks